Nov. 1, 1932. W. L. MORELAND 1,886,349

MOTOR VEHICLE

Filed July 21, 1930 2 Sheets-Sheet 1

Inventor
Watt L Moreland

By

Nov. 1, 1932.  W. L. MORELAND  1,886,349
MOTOR VEHICLE
Filed July 21, 1930  2 Sheets-Sheet 2

Inventor
Watt L. Moreland
By

Patented Nov. 1, 1932

1,886,349

UNITED STATES PATENT OFFICE

WATT L. MORELAND, OF LOS ANGELES, CALIFORNIA, ASSIGNOR OF ONE-HALF TO MORELAND MOTOR TRUCK COMPANY, OF BURBANK, CALIFORNIA

MOTOR VEHICLE

Application filed July 21, 1930. Serial No. 469,535.

My invention relates to motor vehicles having more than two axles, of the type disclosed in my Patent No. 1,743,373, dated January 14, 1930. The object of my invention is to render the construction and the parts which interconnect the adjacent axles with each other and with the frame more flexible in order to relieve the springs, the axle housings and brackets of unnecessary strains and stresses. Another object is to enclose certain movable parts by means of a flexible boot or cover to prevent dust and dirt from entering surfaces in sliding contact while, at the same time, permitting the individual parts unrestricted motion. The invention possesses other advantages, some of which, with the foregoing, are set forth in detail in the following description where I outline in full some forms of the invention which I have selected for illustration in the drawings forming part of my invention. It is to be understood, however, that I do not limit myself to these forms alone since the invention as expressed in the claims may be embodied in other forms.

Like reference numerals refer to like parts throughout the entire specification and in the various views.

Figure 1:
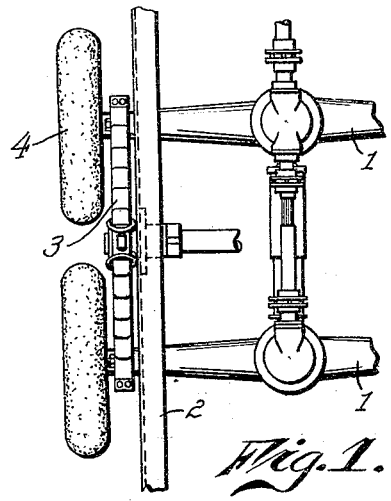
Fig. 1 is a plan view of a portion of two rear axle housings and a motor vehicle frame.

In the drawings, 1 represents the two rear axle housings; 2 a side member of a motor vehicle frame; 3 the springs which interconnect the two axle housings and attach them to the frame in a similar manner as in my patent above cited; 4 are the tires; 5 an enlargement or ball forming part of the axle housing; 6 a bushing which fits said enlargement 5 and with it forms a ball and socket joint. Said bushing 6 is supported by spring bracket 7.

Figure 2:
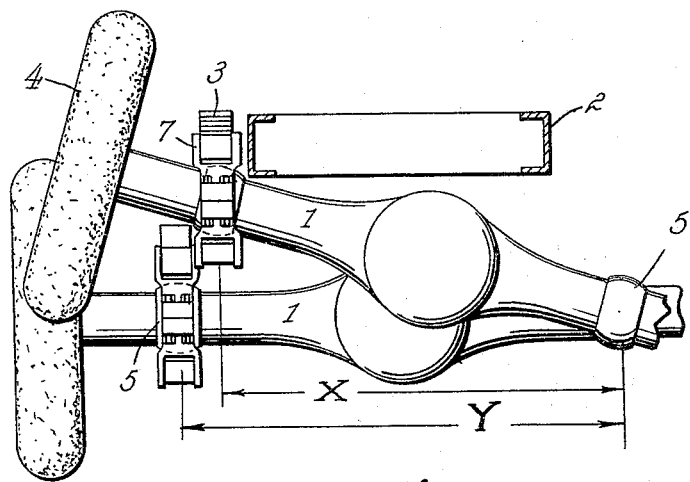
Fig. 2 is a rear view of said two axle housings.
Figure 3:
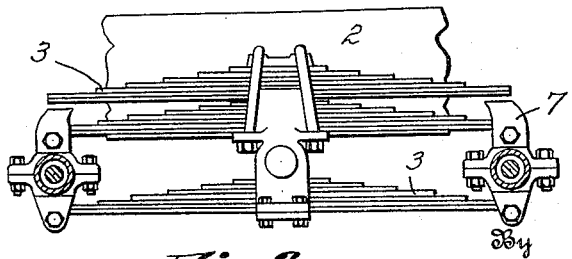
Fig. 3 is a side view with the wheels removed to show the spring suspension.
Figure 4:
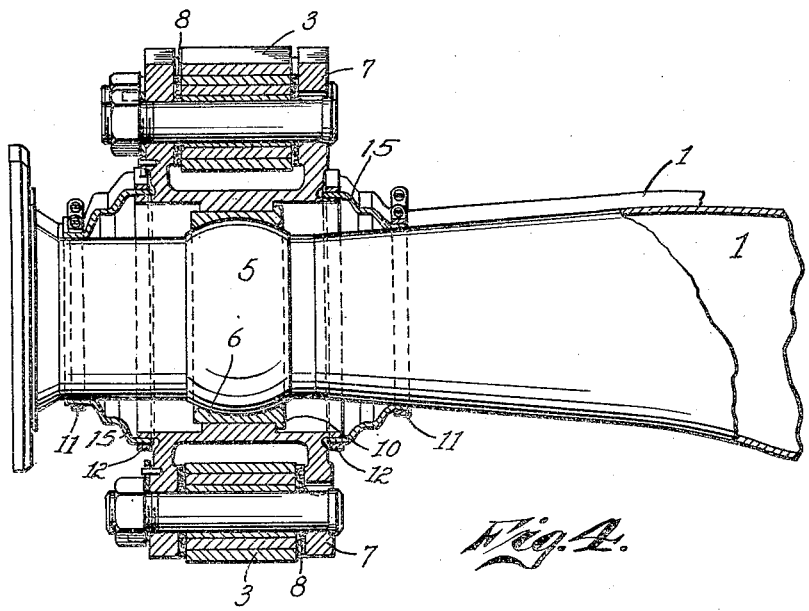
Fig. 4 is a rear view similar to that of Fig. 2, with the parts embodying my invention shown on an enlarged scale in cross section.

When one end of one axle housing should rise, as illustrated in Fig. 2, the ball and socket joint would permit the spring bracket 7 to maintain a vertical position but at the same time there would be a tendency for said spring bracket to move closer toward the middle of the axle, since the horizontal distance X of the axle housing, which is in a tilted position, is smaller than the horizontal distance Y of the axle housing which remained horizontal, as shown exaggerated in Fig. 2. In order to relieve the construction of the strains and stresses which would accompany the tendency of the springs 3, which are retained by the spring bracket 7, to move away from their normal position, I allow a clearance between springs and the spring brackets as shown, which clearance I fill up by a soft washer 8 of a yieldable material which would permit the bracket to slide slightly to one side while the spring retains its normal position, by compressing said yieldable washer 8. In order to still further increase the flexibility of the construction, I provide a sliding surface between bracket 7 and bushing 6 as shown in Figs. 4 and 5, thereby permitting the spring bracket to remain in its normal position while the enlargement 5 of the axle housing and bushing 6 may move away from the bracket as would happen when one axle housing should assume a tilted position, as illustrated in Fig. 2.

Figure 5:
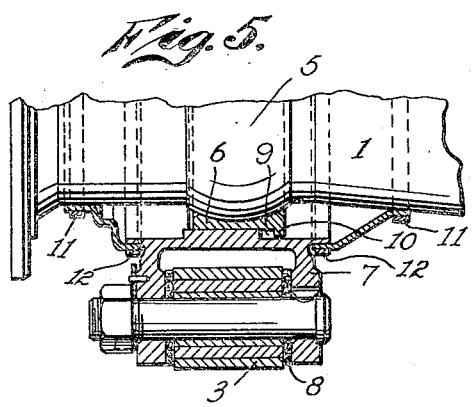
Fig. 5 is a portion of a rear axle housing more fully illustrating the action of my invention.

Fig. 5 shows how said enlargement 5 and bushing 6 may move to the right while 7 remains in its normal position. 9 indicates the amount of motion in this particular instance between 6 and 7. If desired, said washer 8 may be dispensed with altogether and the sliding motion between 6 and 7 made sufficient for all practical purposes. As noted in Figs. 4 and 5, the projection 10 of the bushing 6 holds the axle housing in its position since the spring is attached to the frame at its center and the spring ends to spring brackets which through concave bushing 6 hold the axle housing in its normal positions;

the projection 10 facing toward the middle of the housing prevents the entire axle housings from moving to the left. The right half of the axle housing, not shown in Figs. 4 and 5, is similarly constructed and a similar projection 10 facing the middle of the housing prevents the axle housing from moving to the right. When, however, one end of the axle housing should move upward, bushing 6 would be free to slide inwardly toward the middle of the housing, see distance 9 in Fig. 5, while the bracket 7 would still maintain its normal position.

Figure 6:
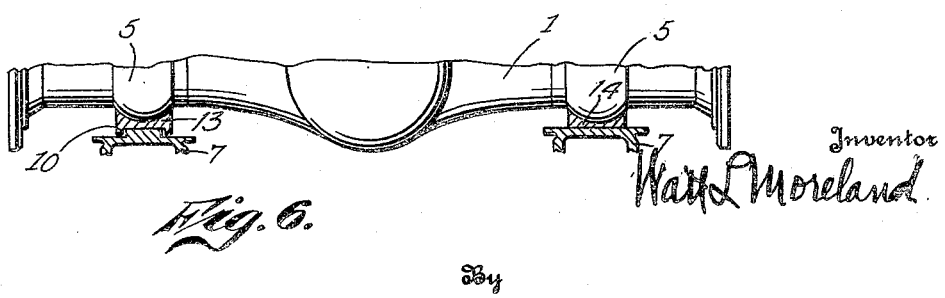
Fig. 6 shows a portion of the axle housing illustrating a modified form of my invention.

Instead of permitting said bushings to slide away from the brackets on both sides of the axle housings, I may allow sliding motion between the bushings and brackets on one side of the axle housings only and confine the other bracket by projections 10 on each side of the bushings, as indicated in Fig. 6, which shows this modified form of my invention. At the left, the bushing 13 is shown to have two projections 10 on each side, thereby preventing bracket 7 from moving either to the right or to the left. Bushing 14 on the right hand side of the axle housing has no projections and it is therefore free to slide to the right or to the left with respect to bracket 7.

In order to positively exclude dust and dirt from the sliding surfaces between said bushings and spring brackets and also between the bushings and the enlargement 5 of the axle housing, I provide flexible boots or coverings 15 which are attached to the axle housings and the brackets by clamps 11 and 12 respectively, as seen from the illustration. Said boots may be made of any suitable material, for instance, of molded rubberized fabric having certain corrugations or convolutions to permit the boots to become longer or shorter, as shown in Fig. 5.

Having now described my invention, what I claim as new and desire to protect by Letters Patent is:

1. In a motor vehicle, a plurality of axle housings, said axle housings interconnected by a plurality of springs, the axle housings in universal connection with the spring ends through ball-and-socket joints, the balls rigid with the axle housings, spring brackets in pivotal connection with the spring ends and means for permitting said brackets to slide horizontally sidewise with respect to the universal joints.

2. In a motor vehicle, a plurality of axle housings, said axle housings interconnected by a plurality of springs, ball-and-socket joints between the spring ends and the housings, the ball member of the joints rigid with the axle housings, means for enabling the springs to move laterally with respect to the ball-and-socket joints in one direction only from their normal position and for effectively preventing them from moving in the opposite direction.

3. In a motor vehicle, a plurality of axle housings, said axle housings interconnected by a spring, ball-and-socket joints between the ends of the spring and the housing, the ball member of the joints rigid with the axle housings, spring brackets in pivotal connection with said ends of the spring, means for permitting relative lateral displacement between the spring ends, the brackets and the ball-and-socket joints.

WATT L. MORELAND.